US010525924B2

United States Patent
Abe et al.

(10) Patent No.: US 10,525,924 B2
(45) Date of Patent: Jan. 7, 2020

(54) OCCUPANT LEG RESTRAINT DEVICE

(71) Applicant: JOYSON SAFETY SYSTEMS JAPAN K.K., Tokyo (JP)

(72) Inventors: Kazuhiro Abe, Shiga (JP); Norihisa Okada, Shiga (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 0 days.

(21) Appl. No.: 15/768,635

(22) PCT Filed: Oct. 14, 2016

(86) PCT No.: PCT/JP2016/080486
§ 371 (c)(1),
(2) Date: Apr. 16, 2018

(87) PCT Pub. No.: WO2017/073356
PCT Pub. Date: May 4, 2017

(65) Prior Publication Data
US 2019/0061667 A1 Feb. 28, 2019

(30) Foreign Application Priority Data
Oct. 28, 2015 (JP) .................................. 2015-211715

(51) Int. Cl.
*B60R 21/206* (2011.01)
*B60R 21/231* (2011.01)
(Continued)

(52) U.S. Cl.
CPC .......... *B60R 21/206* (2013.01); *B60R 21/231* (2013.01); *B60R 21/233* (2013.01);
(Continued)

(58) Field of Classification Search
CPC ... B60R 21/206; B60R 21/231; B60R 21/233; B60R 2021/23169
See application file for complete search history.

(56) References Cited

U.S. PATENT DOCUMENTS

| 7,195,275 B2 | 3/2007 | Abe |
| 7,891,700 B2 | 2/2011 | Ishida |

(Continued)

FOREIGN PATENT DOCUMENTS

| AU | 6945401 A | 1/2002 | |
| DE | 102007000635 B4 * | 2/2014 | ........... B60R 21/231 |

(Continued)

OTHER PUBLICATIONS

International Search Report with English language translation and Written Opinion issued in International Application No. PCT/JP2016/080486 dated Nov. 8, 2016.

*Primary Examiner* — Nicole T Verley
(74) *Attorney, Agent, or Firm* — Foley & Lardner LLP

(57) ABSTRACT

Provided is an occupant leg restraint device suitable for restraining legs of an occupant when an automobile has an oblique collision. An occupant leg restraint device 1 has an airbag 4 that inflates in front of legs of an occupant in a front seat of an automobile, and an inflator 5 for supplying gas to the lower part of the airbag 4 to inflate the airbag 4. The airbag 4 has a first pane 11 on the occupant side and a second panel 12 on the side opposite thereto. A plurality of pockets 60 recessed from the first panel 11 in the direction away from the occupant are provided in the upper part of the airbag 4. Knees N of the occupant enter the pockets 60, and fit into and engage with the pockets 60, and the lateral movement of the knees N is thereby restrained.

7 Claims, 7 Drawing Sheets

(51) Int. Cl.
*B60R 21/233* (2006.01)
*B60R 21/26* (2011.01)
*B60R 21/00* (2006.01)

(52) U.S. Cl.
CPC ...... *B60R 21/26* (2013.01); *B60R 2021/0009* (2013.01); *B60R 2021/0053* (2013.01); *B60R 2021/23169* (2013.01); *B60R 2021/23324* (2013.01)

(56) References Cited

U.S. PATENT DOCUMENTS

| | | | |
|---|---|---|---|
| 8,272,667 | B2 | 9/2012 | Schneider et al. |
| 9,446,733 | B2 * | 9/2016 | Pausch .................. B60R 21/231 |
| 10,065,594 | B2 * | 9/2018 | Fukawatase .......... B60R 21/233 |
| 10,252,689 | B2 * | 4/2019 | Patel ..................... B60R 21/206 |
| 2018/0345899 | A1 * | 12/2018 | Munsee ................ B60R 21/233 |

FOREIGN PATENT DOCUMENTS

| | | |
|---|---|---|
| EP | 0 952 043 B1 | 6/2004 |
| EP | 1 270 338 B1 | 12/2005 |
| EP | 1 262 378 B1 | 10/2008 |
| EP | 1 310 408 B1 | 9/2009 |
| JP | H11-321539 A | 11/1999 |
| JP | 2002-249016 A | 9/2002 |
| JP | 2002-337642 A | 11/2002 |
| JP | 2002-337654 A | 11/2002 |
| JP | 2003-182504 A | 7/2003 |
| JP | 2003-205816 A | 7/2003 |
| JP | 2003-220920 A | 8/2003 |
| JP | 2005-186886 A | 7/2005 |
| JP | 2008-265660 A | 11/2008 |
| JP | 2009083617 A * | 4/2009 |
| JP | 4-877280 B2 | 2/2012 |
| JP | 2013-510032 A | 3/2013 |
| JP | 5212555 B2 * | 6/2013 |
| JP | 2014-043228 A | 3/2014 |
| JP | 5984586 B2 * | 9/2016 |
| WO | WO-02/04261 A1 | 1/2002 |
| WO | WO-2011/035199 A1 | 3/2011 |
| WO | WO-2013/054397 A1 | 4/2013 |
| WO | WO-2018147057 A1 * | 8/2018 |

* cited by examiner

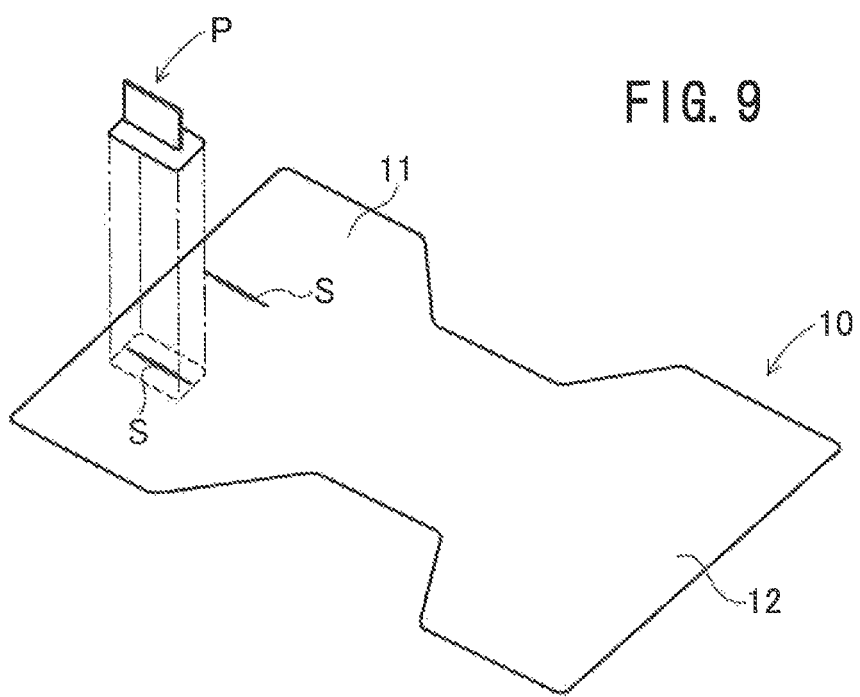

OCCUPANT LEG RESTRAINT DEVICE

RELATED APPLICATIONS

The present application claims priority under 37 U.S.C. § 371 to International Patent Application No. PCT/JP2016/080486, filed Oct. 14, 2016, which claims priority to and the benefit of Japanese Patent Application No. 2015-211715 filed on Oct. 28, 2015. The contents of these applications are hereby incorporated by reference in their entireties.

TECHNICAL FIELD

The present invention relates to an occupant leg restraint device for restraining legs of an occupant during an automobile collision, and more specifically, it relates to an occupant leg restraint device that restrains legs of an occupant in a front seat with an airbag.

BACKGROUND ART

There is known an airbag device that inflates an airbag by means of an inflator at each part around an occupant to restrain the body of the occupant at the time of a collision of a vehicle such as an automobile or rollover of the vehicle body. For example, an occupant leg restraint device inflates an airbag in front of legs of an occupant in a front seat (driver seat or passenger seat) to restrain the legs of the occupant.

As the airbag of the occupant leg restraint device, one obtained by sewing together a first panel on the occupant side and a second panel on the instrument panel side is used. One in which a first panel and a second panel are connected by tethers made of fabric to limit the inflated thickness of the airbag is known. A configuration in which the inside of an airbag is divided into a plurality of chambers by tethers is known.

PTL 1: Japanese Unexamined Patent Application Publication No. 11-321539
PTL 2: Japanese Unexamined Patent Application Publication No. 2002-249016
PTL 3: Japanese Unexamined Patent Application Publication No. 2003-182504
PTL 4: Japanese Unexamined Patent Application Publication No. 2003-220920
PTL 5: Japanese Unexamined Patent Application Publication (Translation of PCT Application) No. 2013-510032
PTL 6: Japanese Unexamined Patent Application Publication No. 2002-337642
PTL 7: Japanese Unexamined Patent Application Publication No. 2002-337654
PTL 8: Japanese Patent No. 4877280

SUMMARY OF INVENTION

It is an object of the present invention to provide an occupant leg restraint device that is suitable for restraining legs of an occupant when an automobile has an oblique collision.

The occupant leg restraint device of the present invention comprises an airbag that inflates in front of legs of an occupant in a front seat of an automobile; and an inflator for supplying gas to the lower part of the airbag to inflate the airbag; the airbag having a first panel on an occupant side and a second panel on a side opposite thereto, wherein a plurality of pockets recessed from the first panel in the direction away from the occupant are provided in the upper part of the airbag. The pockets may be arranged to be vertically long.

In one aspect of the occupant leg restraint device of the present invention, the pockets are formed of panels separate from the first panel. In this aspect, the first panel may be provided with a slit, the pockets may have two pocket panels, the peripheries of panel main surfaces of the two pocket panels may be sewn together, and seam allowances continuous with the panel main surfaces of the two pocket panels may be sewn to around the slit of the first panel.

In one aspect of the occupant leg restraint device of the present invention, the upper part of the inside of the airbag is divided into a plurality of chambers by vertical separating panels joined to the first panel and the second panel and extending vertically, and the pockets are provided in any one of the plurality of chambers. In this aspect, below the plurality of chambers, there may be a continuous chamber continuous from the left end side to the right end side of the airbag, and the plurality of chambers and the continuous chamber may be separated by a horizontal separating panel extending in the lateral direction of the airbag.

In one aspect of the occupant leg restraint device of the present invention, the number of the pockets may be three or four.

The airbag of the present invention is used in an occupant leg restraint device, and the airbag comprises a first panel on the occupant side and a second panel on the side opposite thereto, wherein a plurality of pockets recessed from the first panel in the direction away from the occupant are provided in the upper part of the airbag. Advantageous Effects of Invention In the present invention, since a plurality of pockets recessed from the first panel on the occupant side in the direction away from the occupant are provided in the upper part of the airbag, the knees of the occupant enter the pockets, and fit into and engage with the pockets, and the lateral movement of the knees can thereby be restrained.

BRIEF DESCRIPTION OF DRAWINGS

FIG. 8b is a view as seen from line VIIIb-VIIIb of FIG. 8a.
FIG. 9 is a view illustrating the attachment of the pocket piece.

DESCRIPTION OF EMBODIMENTS

Figure 1:
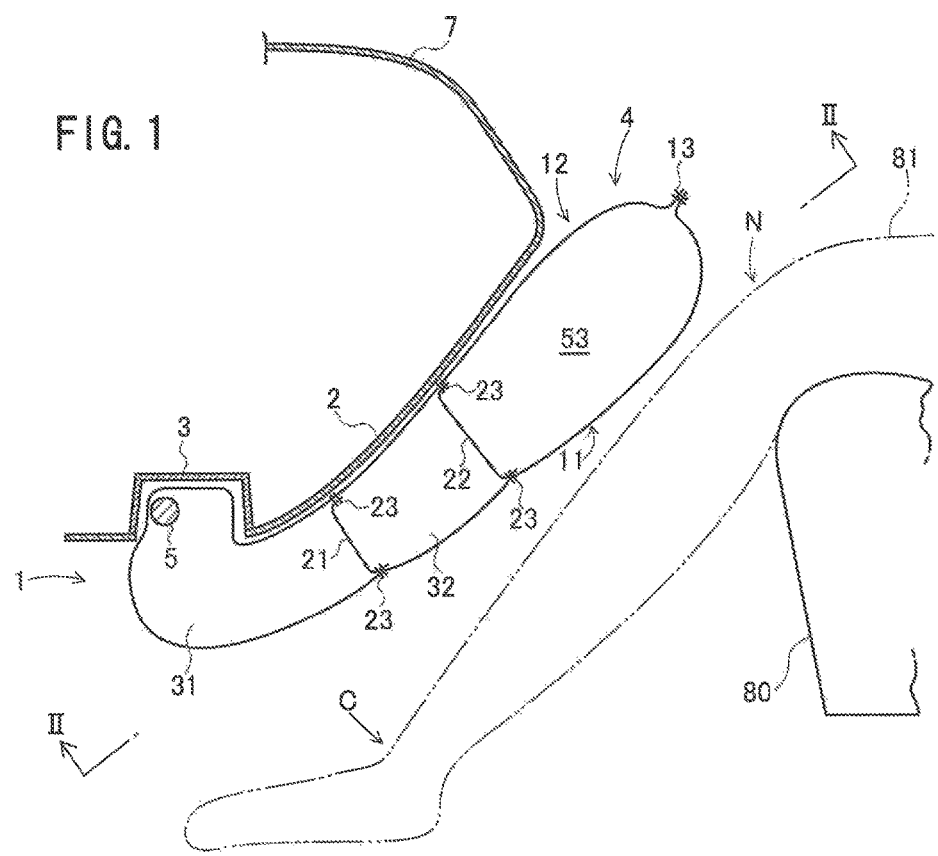
FIG. 1 is a vertical sectional view in the automobile longitudinal direction showing an operating state of an occupant leg restraint device according to an embodiment.
Figure 2:
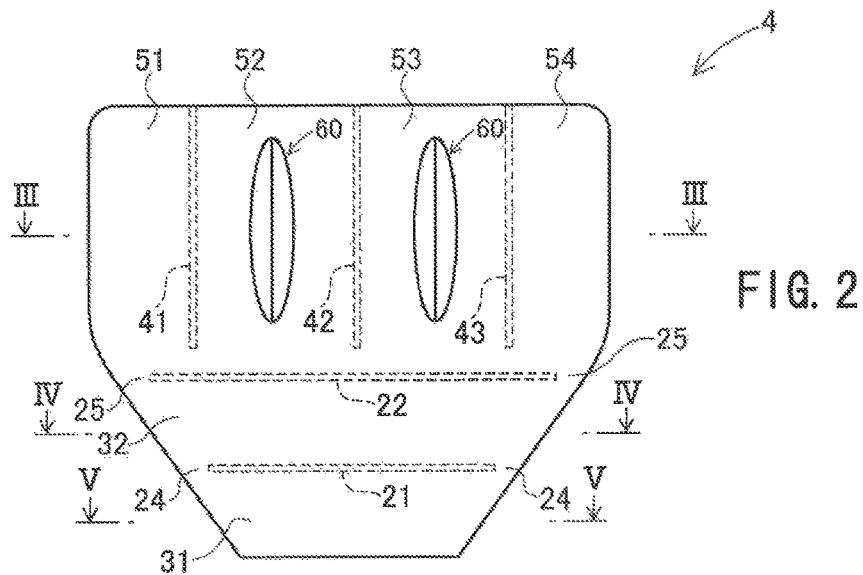
FIG. 2 is a view as seen from line II-II of FIG. 1.
Figure 3:
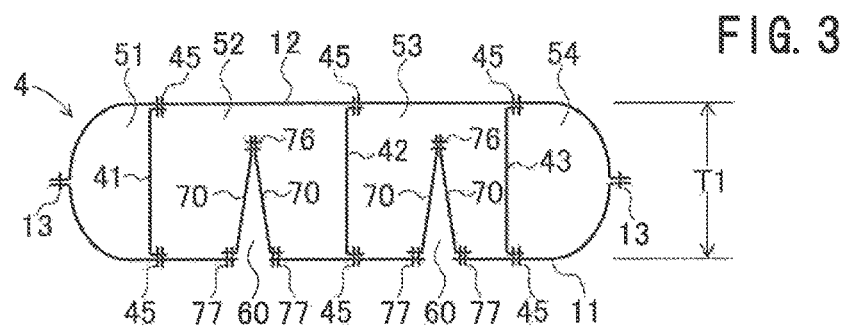
FIG. 3 is a sectional view taken along line III-III of FIG. 2.
Figure 4:
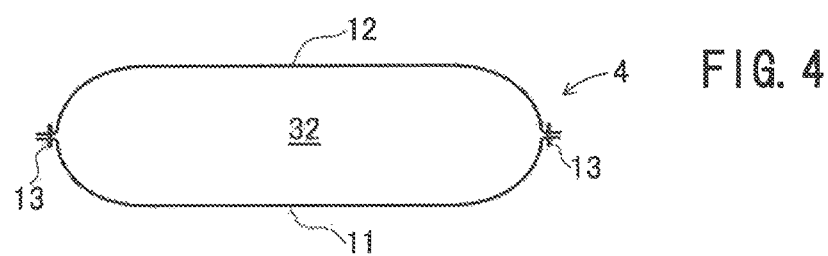
FIG. 4 is a sectional view taken along line IV-IV of FIG. 2.
Figure 5:
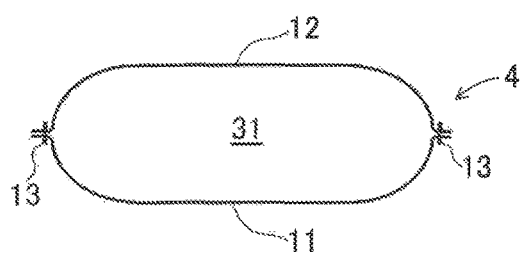
FIG. 5 is a sectional view taken along line V-V of FIG. 2.

Hereinafter, referring to FIGS. 1 to 11, an occupant leg restraint device according to an embodiment of the present invention will be described. In the present invention, the front-rear, up-down, and left-right directions correspond to the front-rear, up-down, and left-right directions of the vehicle unless otherwise noted.

The occupant leg restraint device 1 according to this embodiment is installed in a downward-facing part of an interior board 2 in front of a passenger seat of an automobile. The interior board 2 is installed below a dashboard 7.

The occupant leg restraint device 1 includes a case 3 that is disposed on the back side of the interior board 2, an air bag 4 that is folded and housed in the case 3, and an inflator 5 that inflates the airbag 4. A front surface of the case 3 is covered by a lid (not shown). The lid is provided with a tear line (not shown) that tears when the airbag 4 inflates. The case 3 is fixed to a vehicle body side member with a bracket (not shown) therebetween.

The airbag 4 has a first panel 11 on the occupant side and a second panel 12 on the interior board 2 side. The first panel 11 and the second panel 12 are formed of one base fabric 10 (see FIG. 9), the base fabric 10 is folded back, one half is the first panel 11 and the other half is the second panel 12. By joining together the peripheries of the first panel 11 and the second panel 12 by means of a linear seam 13, a bag-like airbag 4 is obtained.

The lower part of the inside of the airbag 4 is divided into horizontally long chambers 31, 32 by horizontal separating panels 21, 22 extending in the lateral direction. The chambers 31, 32 are continuous chambers that are continuous from the left end to the right end of the airbag 4. Although the inflator 5 is placed in the lower chamber 31, the inflator may be placed outside the airbag.

The upper part of the inside of the airbag 4 is divided into chambers 51, 52, 53, 54 by vertical separating panels 41, 42, 43 extending vertically.

One long side parts of the horizontal separating panels 21, 22 are sewn to the first panel 11 with the sewn thread 23, and the other long side parts of the horizontal separating panels 21, 22 are sewn to the second panel 12 with the sewn thread 23.

Both lateral ends of the horizontal separating panels 21, 22 are slightly separated from the left side and the right side of the airbag 4, and spaces 24, 25 for gas flow are provided between both lateral ends of the horizontal separating panels 21 and 22 and both lateral ends of the lower part of the airbag 4.

The horizontal separating panel 22 is provided with openings (not shown) that make the chamber 32 communicate with the chambers 51 to 54 in the upper part of the inside of the airbag 4. The chambers 51 and 54 communicate with the chamber 32 also through the spaces 25. Openings may be provided in the horizontal separating panel 22 such that the chambers 51 and 54 communicate with the chamber 32 only through the spaces 25.

One long side parts of the vertical separating panels 41 to 43 are sewn to the first panel 11 with the sewing thread 45, and the other long side parts of the vertical separating panels 41 to 43 are sewn to the second panel 12 with the sewing thread 45. The lower edge parts of the vertical separating panels 41 to 43 may be sewn to the horizontal separating panel 22.

The chamber 52 between the vertical separating panel 41 and the vertical separating panel 42 and the chamber 53 between the vertical separating panel 42 and the vertical separating panel 43 are provided with pockets 60 that are recessed from the surface of the first panel 11 in the direction away from the occupant (toward the inside of the airbag 4). When viewing the airbag 4 from the side of the first panel 11 directly, the pockets 60 extend vertically and are arranged to be vertically long.

Figure 6:
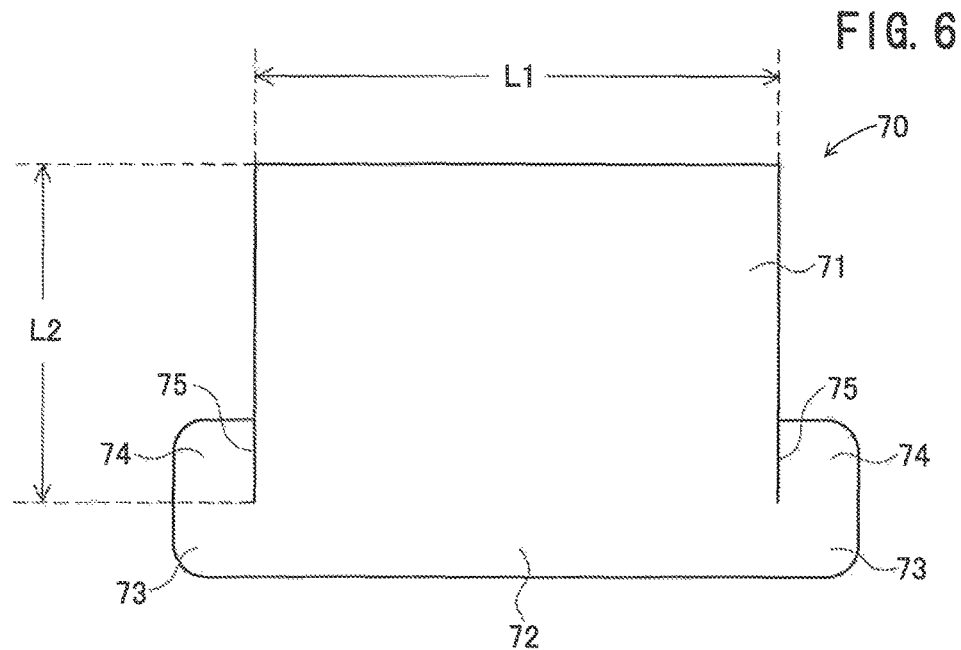
FIG. 6 is a plan view of a pocket panel.

The pockets 60 are each formed of two pocket panels 70. As shown in FIG. 6, the pocket panels 70 have a substantially concave octagonal shape (substantially T shape), and each have a rectangular panel main surface 71, a seam allowance 72 continuous with one side (the lower piece in the figure) of the panel main surface 71, protruding portions 73, 73 protruding from both ends of the seam allowance 72 in the longitudinal direction (left-right direction in the figure), and ear portions 74, 74 extending from the protruding portions 73, 73 along the side portions of the panel main surface 71 (upward in the figure). Cuts 75, 75 are formed between the panel main surface 71 and the ear portions 74, 74.

The size of the panel main surface 71 is determined by the size of the pockets 60 provided in the airbag 4. For example, the length L1 is preferably about 100 to 250 mm, and the length L2 in the direction perpendicular to the direction of the length L1 is preferably about 30 to 100 mm. The length L1 corresponds to the vertical width of the pockets 60, and the length L2 corresponds to the depth of the pockets 60.

Figure 7:
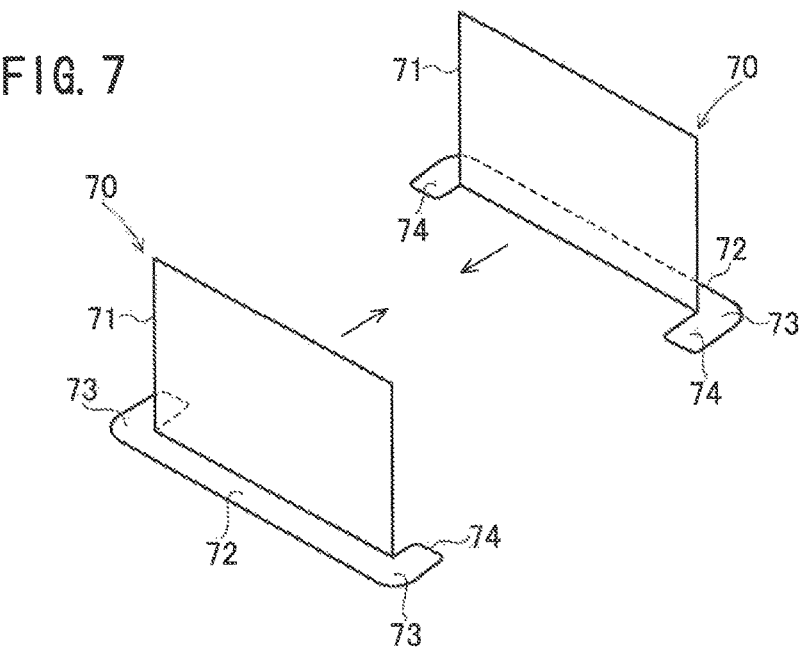
FIG. 7 is a view showing the superimposition of two pocket panels.
Figure 8A:
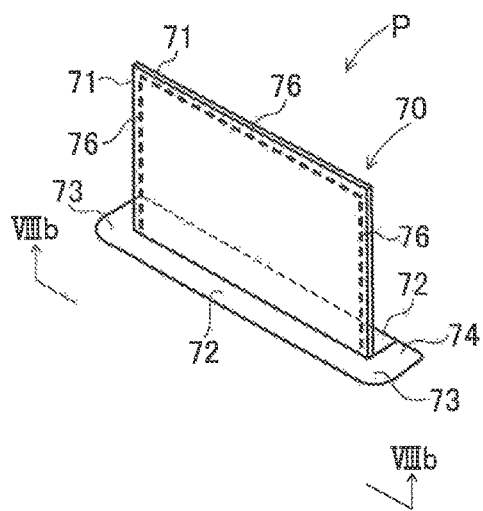
FIG. 8a is a perspective view of a pocket piece.
Figure 8B:
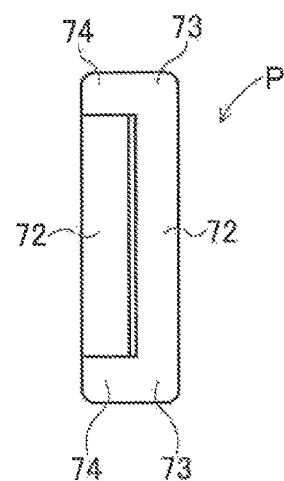
Figure 10:
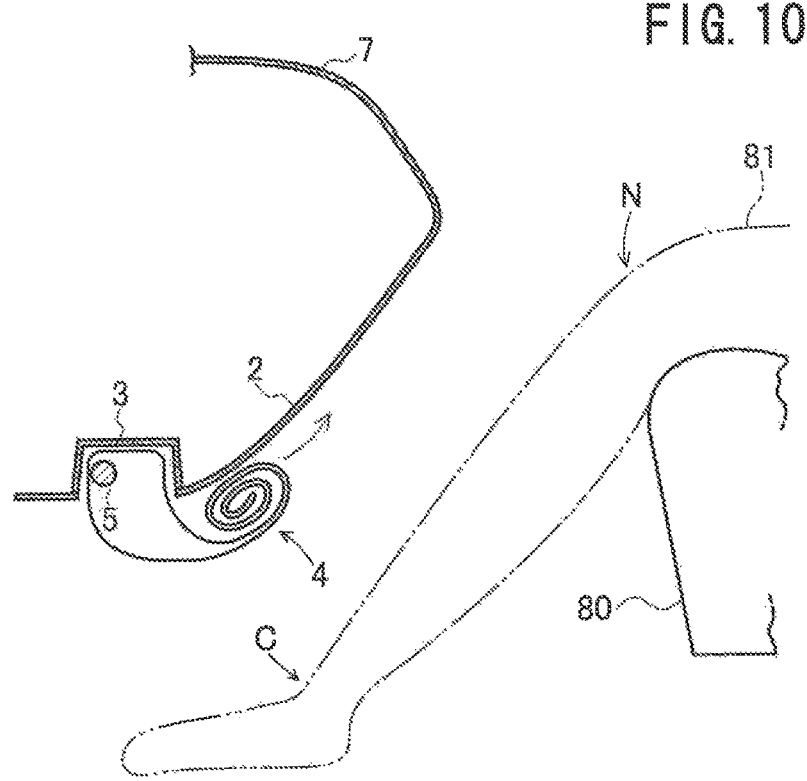
FIG. 10 is a view showing an example of deployment of the airbag.

As shown in FIGS. 7, 8 (a) and 8 (b), the panel main surfaces 71 of two pocket panels 70 are erected, the panel main surfaces 71 are superimposed on each other, and the protruding portions 73 and the ear portions 74 of one of the pocket panels 70 are superimposed on the ear portions 74 and the protruding portions 73 of the other pocket panel 70, and the three sides of the panel main surfaces 71, 71 are sewn together by means of a seam 76. A pocket piece P is thereby fabricated.

As shown in FIG. 9, slits S are provided in the pocket forming portions of the first panel 11 region of the base fabric 10. The portion to be the pocket 60 between the panel main surfaces 71, 71 and the slit S are aligned, and the seam allowances 72, the protruding portions 73, and the ear portions 74, and the periphery of the slit S of the first panel 11 are sewn together by means of a seam 77 (see FIG. 3). By sewing so as to circle around the seam allowances 72, the protruding portions 73, and the ear portions 74, the pocket piece P and the first panel 11 are joined to form the pocket 60.

The base fabric 10 is provided with insertion holes or the like through which bolts protruding from the inflator 5 are inserted, but is not shown in the figure. The pocket pieces P, the horizontal separating panels 21, 22, the vertical separating panels 41, 42, 43, etc. are sewn to the base fabric 10, the inflator 5 is disposed, the base fabric 10 is folded back, the peripheries of the first panel 11 and the second panel 12 are sewn together, and the airbag 4 is thereby fabricated. The airbag 4 is folded by roll folding from the upper part to the lower part and housed in the case 3.

When an automobile equipped with the occupant leg restraint device 1 thus configured has a collision, the inflator 5 is actuated, gas is ejected, and the airbag 4 starts inflating. As the airbag 4 starts inflating, the lid is opened, and the airbag 4 expands into the vehicle cabin and deploys upward along the front surface of the interior board 2 (see FIG. 10).

In the occupant leg restraint device 1, the lower part of the inside of the airbag 4 is divided into the chambers 31, 32, and the lower chamber 31 starts inflating first. In this case, almost all of the gas pressure acts as the inflation pressure of the chamber 31, and the chamber 31 inflates quickly. After the inflation of the chamber 31, the chamber 32 inflates along the interior board 2.

The horizontal separating panels 21, 22 that define the chambers 31, 32 extend linearly in the lateral direction, and the lower part of the airbag 4 inflates quickly in the lateral direction.

In this embodiment, since the lateral width of the lower part of the airbag 4 is smaller than the lateral width of the upper part, the lower part of the airbag 4 inflates early.

The gas in the chamber 32 is supplied through the spaces 25 and the openings provided in the horizontal separating panel 22 to the chambers 51 to 54, and the chambers 51 to 54 inflate. The airbag 4 inflates and deploys to slightly above the knees of the occupant. The legs of the occupant are restrained by the thus inflated airbag 4.

The maximum inflated thickness T1 (FIG. 3) of the chambers 51 to 54 is preferably about 80 to 150 mm, more preferably about 100 to 130 mm.

In a state where the airbag 4 has inflated, the horizontal separating panel 22 is located, for example, at a height about midway between the knee N and the ankle C of an AM 50 dummy 81 seated in a seat 80.

Figure 11:
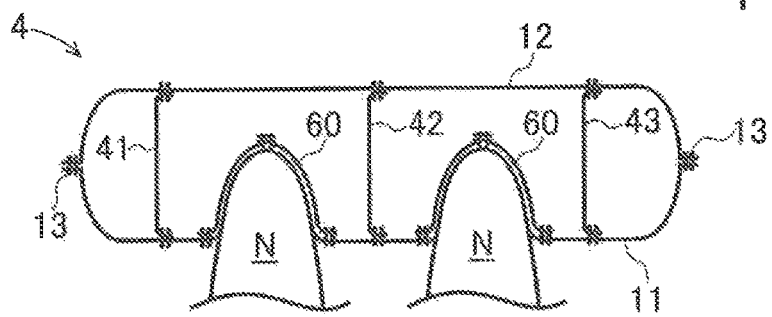
FIG. 11 is a view showing a state where knees are restrained by pockets.

In this embodiment, pockets 60 recessed from the surface of the first panel 11 in the direction away from the occupant are provided. When the chambers 51 to 54 (almost) complete inflation, as shown in FIG. 11, the knees N of the occupant enter the pockets 60 and fit into and engage with the pockets 60, and the lateral movement of the knees N is restrained. Therefore, when the automobile has an oblique collision, the knees N are prevented from moving diagonally forward.

Since the pockets 60 are formed by the pocket pieces P that are separate from the first panel 11, the depth of the pockets 60 in the thickness direction of the airbag 4 can be made large, and the pockets 60 are suitable for restraining the knees N of the occupant. The depth of the pockets 60 that restrain the knees N is preferably about 30 to 80% of the maximum inflated thickness T1 of the chambers 51 to 54.

The airbag 4 may also be provided with a vent hole.

Figure 12:
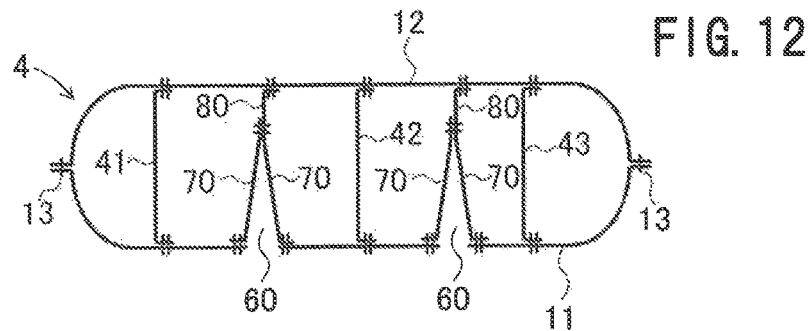
FIG. 12 is a sectional view of an airbag according to another embodiment.

As shown in FIG. 12, tether panels 80 that join the innermost parts of the pockets 60 and the second panel 12 may be provided.

Figure 13:
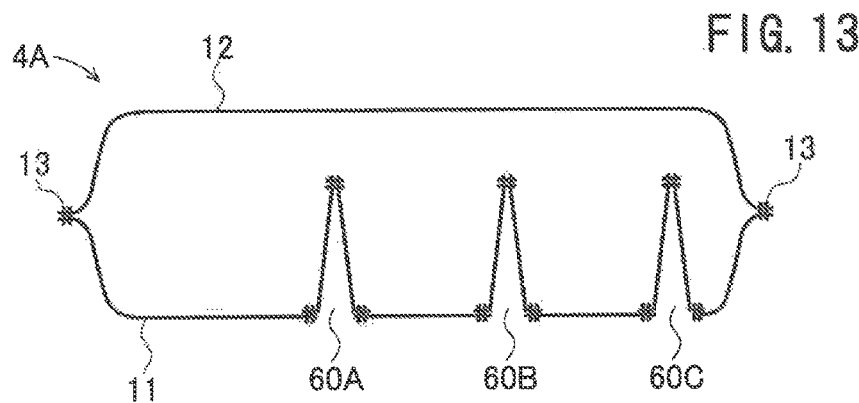
FIG. 13 is a sectional view of an airbag according to another embodiment.

While two pockets 60 are formed in the airbag 4 in the above embodiment, the number of the pockets 60 may be three or more. FIG. 13 shows an airbag 4A in which three pockets 60A, 60B, 60C are formed. The pockets 60A and 60B are located in front of the legs (knees) of the occupant sitting in the normal position in the seat 80, and the pocket 60C is located on the right side of the pocket 60B. In FIG. 13, depiction of the vertical separating panels 41 to 43 is omitted for convenience of explanation.

Figure 14:
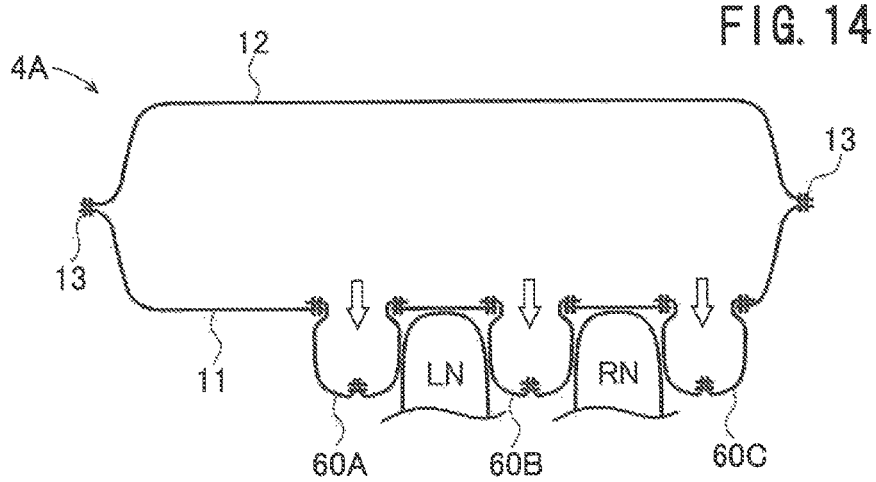
FIG. 14 is a view showing a state where knees are restrained by the airbag shown in FIG. 13.

For example, when the automobile has a collision when the occupant is sitting in a position shifted slightly to the right from the normal position in the seat 80, the left knee is located between the pocket 60A and the pocket 60B, and the right knee is located between the pocket 60B and the pocket 60C. When the airbag 4A is inflated and deployed in such a positional relationship, as shown in FIG. 14, the left knee LN and the right knee RN do not enter the pockets, and the pockets 60A, 60B, 60C protrude from the surface of the first panel 11 to the occupant side. The left knee LN fits and engages between the protruding pockets 60A and 60B, and the right knee RN fits and engages between the protruding pockets 60B and 60C, and therefore the lateral movement of the knees is restrained.

The pocket 60C may be provided on the left side of the pocket 60A. In the case of providing four pockets 60, two pockets are provided in front of the legs (knees) of the occupant sitting in the normal position in the seat 80, and one pocket is provided on each side of these pockets. When the occupant sits in a position shifted left or right from the normal position in the seat 80 and the knees do not enter the pockets, the four pockets protrude, the knees fit between the protruding pockets, and the movement is restrained.

While, in the above embodiment, two chambers (continuous chambers) 31, 32 are formed by the two horizontal separating panels 21, 22 in the lower part of the airbag 4, the number of the continuous chambers may be 1 or 3 or more.

Although the case 3 is provided in the downward-facing surface of the interior board 2 in the above embodiment, the case 3 may be provided nearer to the seat 80 than it.

Although, in the above embodiment, slits S are provided in the pocket forming portions of the first panel 11, elongated rectangular openings may be provided.

The occupant leg restraint device of the present invention may be installed in front of a passenger seat or (may be installed) in front of a driver seat.

The present invention is not limited to the above-described embodiments, and it goes without saying that various modifications can be made without departing from the spirit of the present invention.

This application is based on Japanese Patent Application No. 2015-211715 filed on Oct. 28, 2015, the entirety of which is incorporated by reference.

REFERENCE SIGNS LIST

1 occupant leg restraint device
2 interior board
4, 4A airbag
5 inflator
11 first panel
12 second panel
21, 22 horizontal separating panel
31, 32 chamber
41 to 43 vertical separating panel
51 to 54 chamber
60 pocket

The invention claimed is:

1. An occupant leg restraint device comprising:
   an airbag that inflates in front of legs of an occupant in a front seat of an automobile; and
   an inflator for supplying gas to the lower part of the airbag to inflate the airbag;
   the airbag having a first panel on an occupant side and a second panel on a side opposite thereto,
   wherein a plurality of pockets recessed from the first panel in the direction away from the occupant are provided in the upper part of the airbag, and,
   wherein the pockets are formed of panels separate from the first panel.

2. The occupant leg restraint device according to claim 1, wherein the pockets are arranged to be vertically long.

3. The occupant leg restraint device according to claim 1, wherein the first panel is provided with a slit, and
   wherein the pockets have two pocket panels, the peripheries of panel main surfaces of the two pocket panels are sewn together, and seam allowances continuous with the panel main surfaces of the two pocket panels are sewn to around the slit of the first panel.

4. The occupant leg restraint device according to claim 1, wherein the upper part of the inside of the airbag is divided into a plurality of chambers by vertical separating panels joined to the first panel and the second panel and extending vertically, and wherein the pockets are provided in any one of the plurality of chambers.

5. The occupant leg restraint device according to claim 4, wherein, below the plurality of chambers, there is a continuous chamber continuous from the left end side to the right end side of the airbag, and wherein the plurality of chambers and the continuous chamber are separated by a horizontal separating panel extending in the lateral direction of the airbag.

6. The occupant leg restraint device according to claim 1, wherein the number of the pockets is three or four.

7. An airbag used in an occupant leg restraint device, comprising a first panel on the occupant side and a second panel on the side opposite thereto, wherein a plurality of pockets recessed from the first panel in the direction away from the occupant are provided in the upper part of the airbag, and, wherein the pockets are formed of panels separate from the first panel.

* * * * *